(12) United States Patent
Amo Garrido et al.

(10) Patent No.: US 7,819,001 B2
(45) Date of Patent: Oct. 26, 2010

(54) MINIMUM AERODYNAMIC INTERFERENCE SUPPORT FOR MODELS IN A CRYOGENIC WIND TUNNEL

(75) Inventors: Esteban Amo Garrido, Madrid (ES); Jesús De Pablo Pérez, Madrid (ES); Mario Jiménez De Lago, Madrid (ES)

(73) Assignee: Airbus Operations, S.L., Madrid (ES)

( * ) Notice: Subject to any disclaimer, the term of this patent is extended or adjusted under 35 U.S.C. 154(b) by 25 days.

(21) Appl. No.: 12/232,732

(22) Filed: Sep. 23, 2008

(65) Prior Publication Data

US 2009/0272184 A1    Nov. 5, 2009

(30) Foreign Application Priority Data

Apr. 30, 2008    (ES)    ................................ 200801251

(51) Int. Cl.
*G01M 9/00*    (2006.01)
(52) U.S. Cl. ...................................... 73/147; 73/170.02
(58) Field of Classification Search ........................ None
See application file for complete search history.

(56) References Cited

U.S. PATENT DOCUMENTS

| | | | | |
|---|---|---|---|---|
| 2,711,648 A * | 6/1955 | Carlstrand et al. | ............ | 73/147 |
| 4,116,056 A * | 9/1978 | Bulychev et al. | ............... | 73/147 |
| 4,663,967 A * | 5/1987 | Parkinson | ..................... | 73/147 |
| 4,862,739 A * | 9/1989 | Dobbs | .......................... | 73/147 |
| 6,553,823 B2 * | 4/2003 | Omotani et al. | ................ | 73/147 |
| 6,796,171 B2 * | 9/2004 | Heisler et al. | .................. | 73/147 |
| 7,127,942 B2 * | 10/2006 | Gibson | ......................... | 73/147 |
| 2003/0000298 A1 * | 1/2003 | Heisler et al. | .................. | 73/147 |
| 2003/0177825 A1 * | 9/2003 | Gibson | ......................... | 73/147 |

* cited by examiner

*Primary Examiner*—Andre J Allen
(74) *Attorney, Agent, or Firm*—Wenderoth, Lind & Ponack, L.L.P.

(57) ABSTRACT

A minimum aerodynamic interference support for models in a cryogenic wind tunnel includes two main pieces: a front sting substantially parallel to the longitudinal axis of the model and a blade, integrated together and describing an obtuse angle. The support is connected to the model by means of the blade, being the model such that it emulates a tail section and/or wings of an aircraft. The front sting of the support comprises an extension, extended horizontally underneath a frontal zone of the fuselage of the model, starting from the point where the blade starts and extending past the point where the blade is connected to the model, in such a way that the length and area dimensions of the cross-section of the extension are obtained by applying the aerodynamic principle, area rule, to the ensemble made up by the front sting, the blade, the model and the extension.

12 Claims, 7 Drawing Sheets

MINIMUM AERODYNAMIC INTERFERENCE SUPPORT FOR MODELS IN A CRYOGENIC WIND TUNNEL

OBJECT OF THE INVENTION

As stated in the title of this specification, the present invention relates to providing a support that will minimize aerodynamic interference for testing models in a cryogenic wind tunnel, particularly for models that emulate the tails section and/or wings of an aircraft.

TECHNICAL FIELD OF THE INVENTION

The present invention comes within the aeronautical industry, in the technical field of measurement systems for aerodynamic properties of objects, particularly models that emulate the tails section and/or wings of an aircraft, exposed to an airflow in a wind tunnel, preferably a cryogenic wind tunnel.

Specifically, the present invention was conceived for the sector of systems used for compensating for the effects of the support of the object on the aerodynamic measurements made on that object, said object being a model that preferably emulates the tail section and/or wings of an aircraft and the test conditions being preferably cryogenic.

DESCRIPTION OF RELATED ART

In the design of the elements making up an aircraft, such as the fuselage, wings, rudders, etc., the aerodynamic properties of each component need to be known. During the course of the present description, the fuselage will be understood to be the main body of the aircraft to which the wings and tail are secured, and which is designed in three parts: a front part with a shape that is almost oval, a middle part of almost cylindrical section, and a rear part of conical shape.

Given the large size of aircraft, aerodynamic tests are conducted on models which reproduce the entire aircraft, or at least part of it, to scale. These models are subjected to tests in a wind tunnel.

Figure 1A:
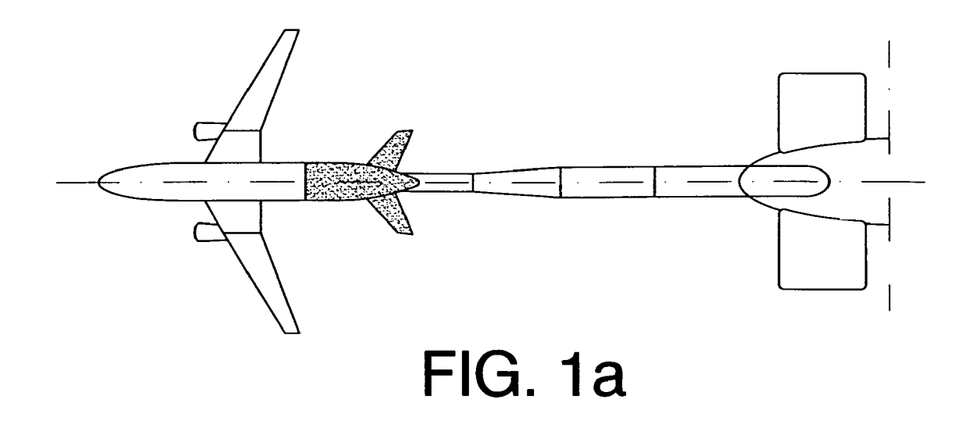
FIG. 1a shows a diagram of the sting type support.

The support known for this type of model in the current state of the art usually consists of a main sting comprising a front sting that is extended in the wind tunnel in the direction opposite to the flow of the airstream and which is coupled via its front end to the rear part of the model (FIG. 1a).

Figure 1B:
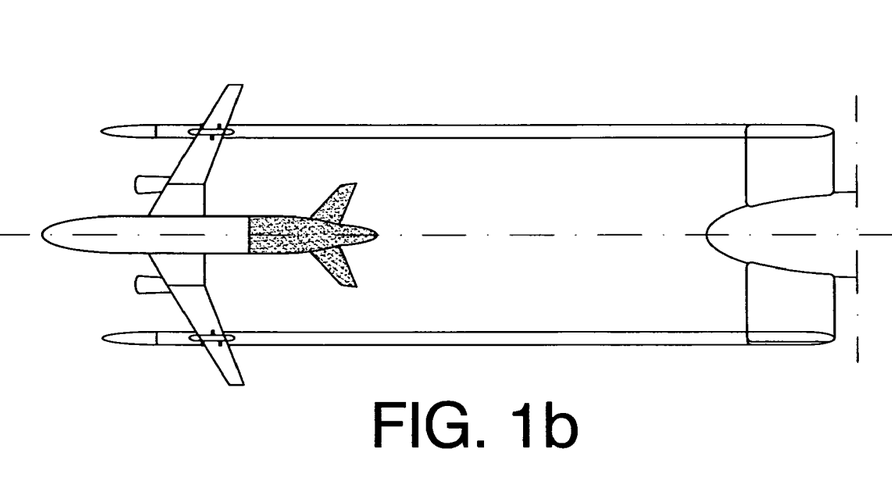
FIG. 1b shows a diagram of the support consisting of two twin front stings.

The aerodynamic behavior of the tail section is especially relevant. Therefore, given that the main sting type support is coupled precisely to the rear part of the model, in other words to the tail of the aircraft, the presence of said main sting support is going to influence the measurements made, which can lead to data with reduced accuracy In order to obtain measurements on the aerodynamic behavior of the tail section, another type of support is used in the current state of the art for the model, consisting of two twin front stings which are symmetrically arranged with respect to the plane of symmetry of the aircraft, and which are secured in the same position on each wing of the model (FIG. 1b). This type of support leaves the rear part (tail section) of the model free, but on the other hand it modifies the geometry of the wing during measurement in the wind tunnel because it limits its deformation, and thus can have a proximity effect on the tail section.

The reason for this is that, when wind circulates around an object, it tries to adapt itself to the shape of that object by changing direction, but this change of direction does not just affect the wind that is directly surrounding the object but is also propagated along the surrounding volume, perturbing the direction of other zones of the wind. This perturbation reduces in intensity far from the object. Therefore, when a support (object) is located attached to a model, there is a proximity effect to be mitigated.

Figure 1C:
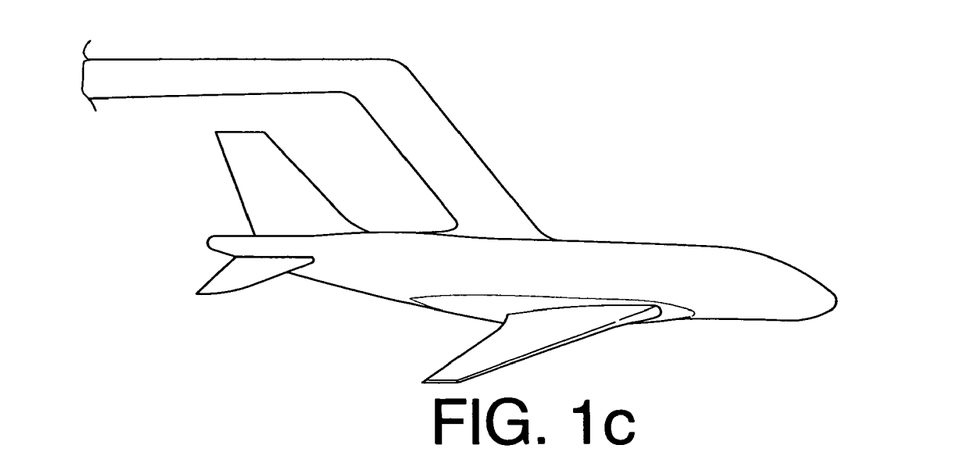
FIG. 1c shows a diagram of the support that is attached to the model at the fuselage, in its middle-rear part, in the upper part thereof.
Figure 1D:
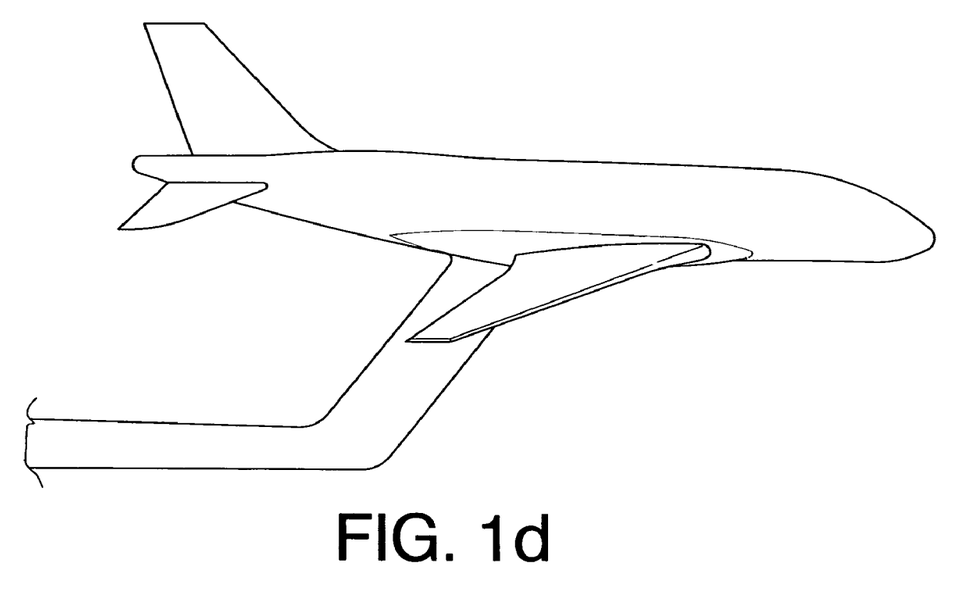
FIG. 1d shows a diagram of the support that is attached to the model at the fuselage, in its middle-rear part, in the lower part thereof.

In order to compensate for this proximity effect in the tail section, there are other kinds of support which are secured to the model from the fuselage, in its middle-rear part, either in the upper area (FIG. 1c) or in the lower area (FIG. 1d) thereof. Nevertheless, this type of support can produce very high interference in the wings and in the tail assembly, especially when testing at high speed, in other words, at speeds of up to Mach 0.97 and Reynolds number of up to 38 million.

It was therefore desirable to obtain a support for models for wind tunnel tests that would overcome these drawbacks, in other words:

which would permit more precise measurement data to be obtained, in other words, with minimum interference or, putting this another way, which would minimize the aerodynamic interference effects, which could be used both for measurements of the aerodynamic behavior of the tail section and of the wings at the same time, and which would minimize the loss of similitude between the aerodynamic behavior of the wind around the model with that which it would have around a real airplane.

In addition to the support mentioned above, known in the prior art is patent application ES200500027 which describes a system for compensating for the effect of the stings on the aerodynamic measurements on the tail sections of the models, carried out in a wind tunnel. This document describes a support with a main sting, which is coupled via its front part to a model which emulates at least the tails section and wing of the aircraft, so the support described by this document enters into the model via the front fuselage, very far from the tails and with the consequent reduced influence.

DESCRIPTION OF THE INVENTION

The present invention relates to providing a support for models in a wind tunnel that will permit measurements to be made with minimum aerodynamic interference, which can be used for measurements of the tail section and of the wings of an aircraft, and under cryogenic test conditions. The configurations disclosed in the prior art also have their counterparts in cryogenic conditions but with the drawbacks associated with their design and position in the model mentioned above, for example, the drawback of proximity, or perturbing the deformation of the wings.

When a wind tunnel test is conducted under cryogenic conditions, a very high quality is required for the results and therefore the drawbacks presented by the above-described configurations reduce the quality of the measurement, and so the data is not as good as it could be.

In the cryogenic test, the loss of similitude between the aerodynamic behavior of the wind around a model with what it would be around a real aircraft can be compensated for by increasing the pressure of the air at rest up to pressures of the order of preferably 4 bars and reducing the temperature of the wind around the model down to cryogenic conditions, in other words preferably of the order of −160° C. (160° C. below zero) the combination of these two effects produces the increasing of the Reynolds number up to flight conditions.

This drop in temperature makes it necessary to eliminate all the air from inside the tunnel and replace it with pure nitrogen in the gaseous state. Therefore, tests in cryogenic conditions can only be conducted in a very limited number of facilities in the entire world which are specially equipped for this. On the other hand, the aerodynamic data produced has an added value in similitude with the real plane when compared with the data obtained in other aerodynamic facilities.

This added value on aerodynamic data is much appreciated and highly advantageous, for example, for actions concerning aircraft cruising, where a small variation in the aerodynamic behavior of the aircraft can, when extended over many hours of flight, have very important industrial implications.

The present invention relates to a support for models in a wind tunnel, preferably cryogenic wind tunnels, where the support is asked to have a minimum aerodynamic interference on the wind around the model. In addition, the support is asked for the minimum interference to be manifested when the support is tested under cryogenic conditions.

So, the present invention describes a support of minimum aerodynamic interference for wind tunnel models in a cryogenic wind tunnel which consists of two main pieces, these pieces being a front sting substantially parallel to the longitudinal axis of the model and a blade (known as such on account of its similarity to the blade of a sword when seen sideways on), combined together and describing an obtuse angle. The support is connected to a model by means of said blade. The model can be such that it emulates the tail sections and/or wings of an aircraft.

Moreover, the front sting of said support includes an extension or bulb which is extended horizontally at the level of a front zone of the fuselage of the model, from where the blade starts and extending past the point at which the blade is connected to the model, in such a way that the length and area dimensions of the cross-section of one cut of the extension are obtained as a result of applying the aerodynamic principle of the area rule to the integral whole made up of the front sting, the blade, the extension and the model, with the dimensions of the extension being made to vary for the correct application of that principle.

The aerodynamic principle of the area rule states that the aerodynamic drag, and therefore the perturbation produced in a fluid surrounding an object flying at high speed, depends on the distribution of its transverse areas. More precisely, it can be said that it depends on how this law (or distribution) of transverse areas changes along the object. So, the law or distribution of areas is the set of pairs of values of "area" and "x" such that to each value of "x" it corresponds an "area".

Applying the aerodynamic principle of the area rule to the present invention, "x" will refer to the horizontal distance measured from the nose of the extension, being positive towards the rear, and "area" will refer to the value of the area that would be obtained by cutting the entire array made up of the front sting, the blade, the extension and the model in the position given by "x" and measuring the area enclosed by a transverse cut made to that array.

Therefore, any external element that is added to a model will change the distribution of transverse areas and will therefore modify its aerodynamic drag and its interference in the fluid, unless this change were to produce a law (or distribution) of areas similar to that of the model without the support in such a way that, although the new law (or distribution) of areas is different from the previous one, the variation in both is the same.

In the case of the present invention, the front sting, as has been said earlier, is designed in such a way that it includes an extension that is horizontally extended at the level of the front fuselage of the model, such that the increase in area that is introduced by the presence of the blade is modified by said extension of the front sting so that the variation in the total final area remains the same as the variation in area before adding the blade and the front sting.

In addition, the support described above must be made of steel, though not just any steel but instead a steel capable of being tested to cryogenic conditions, in other words, high strength steel able to be submitted to temperatures preferably of the order of −160° C. (160° C. below zero) and high pressures. Therefore, of the materials that are currently known, the only one that could be used is the steel: MARAGING G90C.

So, the main advantage contributed by the support described by the present invention relates to the design of its front sting and its extension, specifically to the existence of the extension and the fact that this extension is the result of applying the aerodynamic principle of the area rule and is constructed for working under cryogenic conditions. Given that when the front sting is attached with its extension and blade to the model, a constant displacement is produced in the area rule (or distribution), if it is compared with that of the model without any support, the variation is the same in both cases.

Finally, the support described by the present invention is attached to the model in the front zone of the fuselage of the model, therefore said support remains separated from the wings and tail section which permits a reduction in the possible effect which the support could have on the measurements in those zones.

It is thus observed that no modification occurs to the gradient of the distribution curve of transverse areas of the model with and without support at each point, in other words, the support described by the present invention does not modify the variation in transverse areas of the model to which it is fitted and therefore the aerodynamic interference is minimized.

Another advantage of this type of support is that, as the zone of the tail and the wings remains free, it is possible to conduct tests in both zones at the same time. Given that the measurement of the aerodynamic forces on the model is done with a balance that is introduced into the fuselage, with the support of the present invention a balance can be introduced that is connected just to the tail section, with which just the tail is measured, and a balance can also be connected to the whole model, with which the wings and tail can be measured at the same time.

Furthermore, the support described by the present invention could also be used for tests in wind tunnels at ambient temperature and pressure, though the data produced would not be of such a high quality.

BRIEF DESCRIPTION OF THE FIGURES

The present invention will be entirely understood on the basis of the brief description given below and the accompanying drawings that are presented, solely by way of example and which are therefore not restrictive within the present invention and in which:

FIGS. 1a, 1b, 1c and 1d show the supports existing in the prior art, where

FIG. 2b shows a detail of the dashed area of FIG. 2a, FIG. 3a shows a graph displaying two curves of law (or distribution) of transverse areas of the model, one with support and the other without support.

REFERENCES

1: blade
2: front sting
3: extension or extension of the front sting
4: model
5: front fuselage of the model
A: curve for conventional supports
B: curve for free flight
C: curve for a support like that described by the present invention.

DETAILED DESCRIPTION OF THE INVENTION

The following description is made with the aim of reaching a better understanding of the object and functionality of this patent, and without being understood as restrictive solutions.

Figure 2A:
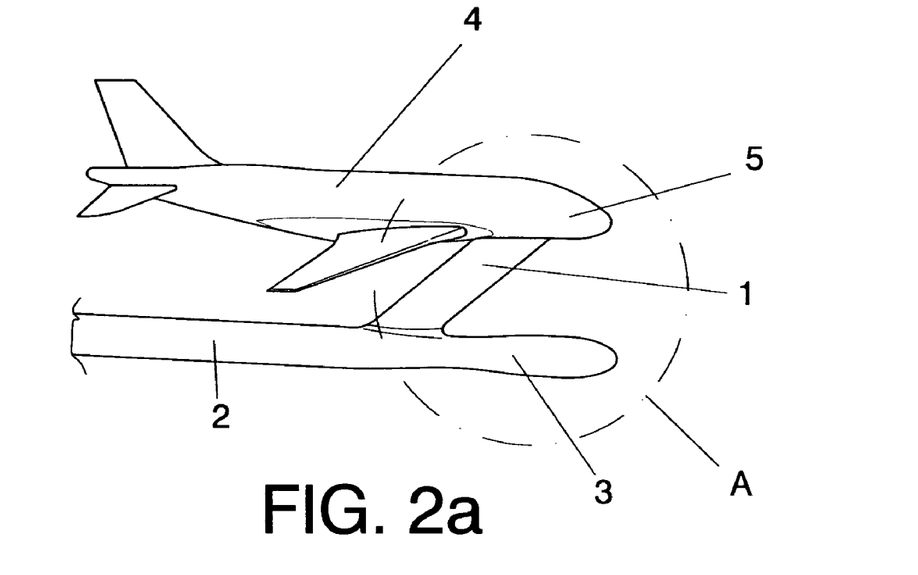
FIG. 2a shows a diagram of the minimum aerodynamic interference support for models in a cryogenic wind tunnel described by the present invention, connected to the front fuselage of an aircraft.
Figure 2B:
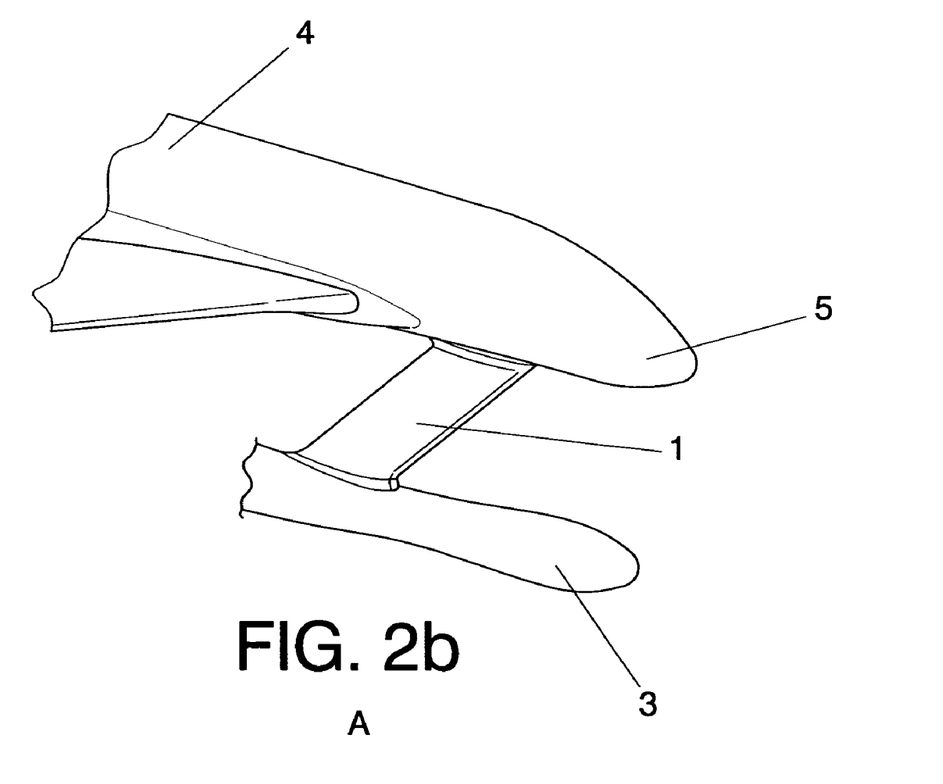

FIG. 2a shows a diagram of the minimum aerodynamic interference support for models in a wind tunnel, preferably cryogenic, consisting of two main pieces, these pieces being a front sting (2) substantially parallel to the longitudinal axis of the model and a blade (1), combined together and describing an obtuse angle, said support being connected to the model (4) by means of the blade (1), and said connection between the blade (1) and the model (4) being made In the front zone of the fuselage (5) of the model (4). In addition, FIG. 2b shows a detail of the dashed area of FIG. 2a, where it can be clearly seen that the front sting (2) is designed in such a way that it includes an extension or bulb (3) which is horizontally extended parallel to the front zone (5) of the fuselage of the model (4). The front sting (2) including the extension (3), the blade (1) and the model (4) make up a single combined object for the purposes of carrying out the test.

Moreover, the length and area dimensions of the cross-section of cut of the extension (3) are obtained by applying the aerodynamic principle of the area rule to the integral whole made up of the front sting (2), the blade (1), the model (4) and the extension (3), with the dimensions of the extension being made to vary in application of that aerodynamic principle.

Figure 3A:
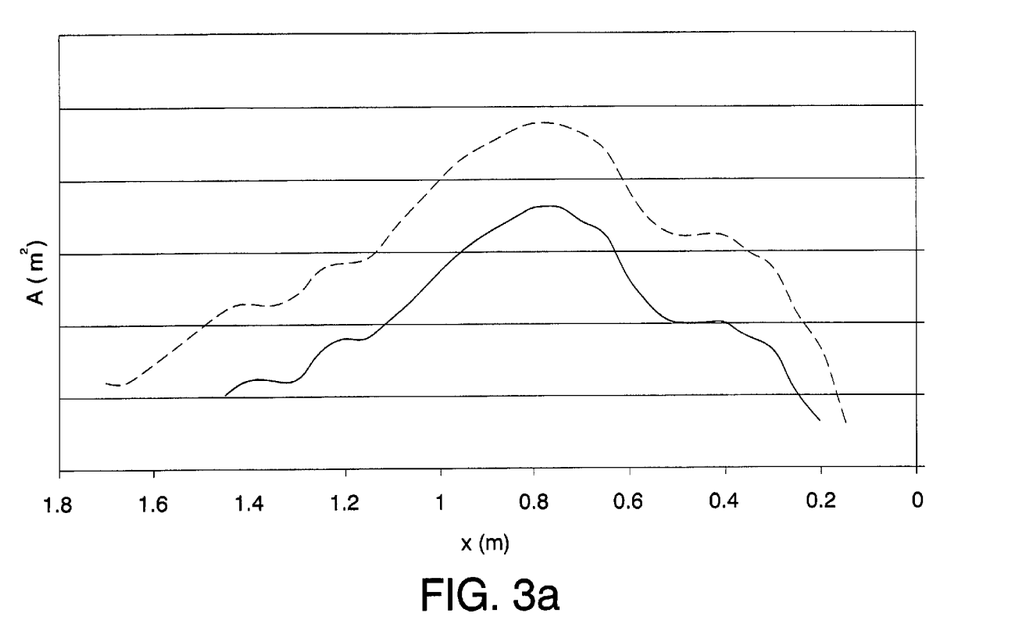

FIG. 3a shows a graph where two curves of law (or distribution) of transverse areas of the model can be seen, where the dashed line corresponds to the model with the support of the present invention and the curve made with a solid line corresponds to the model without support, where it can be seen how the presence of the support of the present invention does not alter the gradient and therefore the variation in the transverse areas of the model to which it is fitted.

Figure 3B:
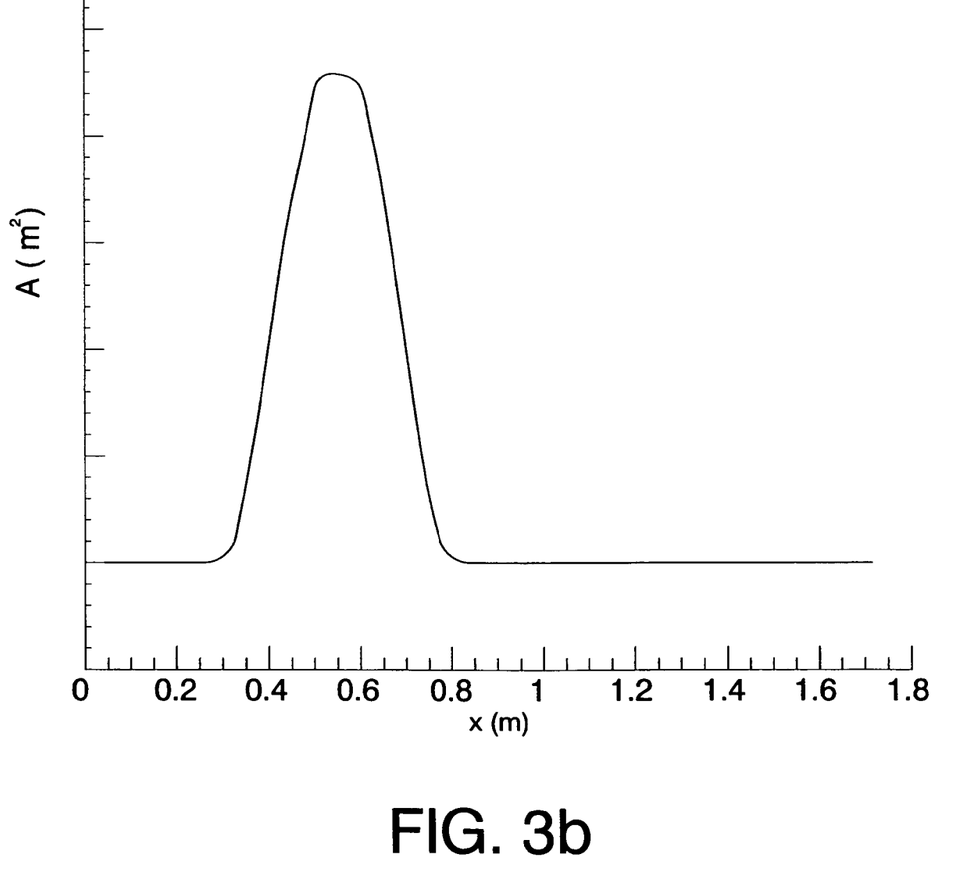
FIG. 3b shows a graph displaying the distribution of areas of the blade (1) along the x axis.

FIG. 3b shows the distribution of areas of a blade (1) for which it can be anticipated that the cross-section of the support at the point where the blade (1) is, in other words, the part of the support corresponding to the extension (3), will be reduced in each interval of space "x" by the quantity necessary for compensating for the increase in area introduced by the blade (1).

Figure 4A:
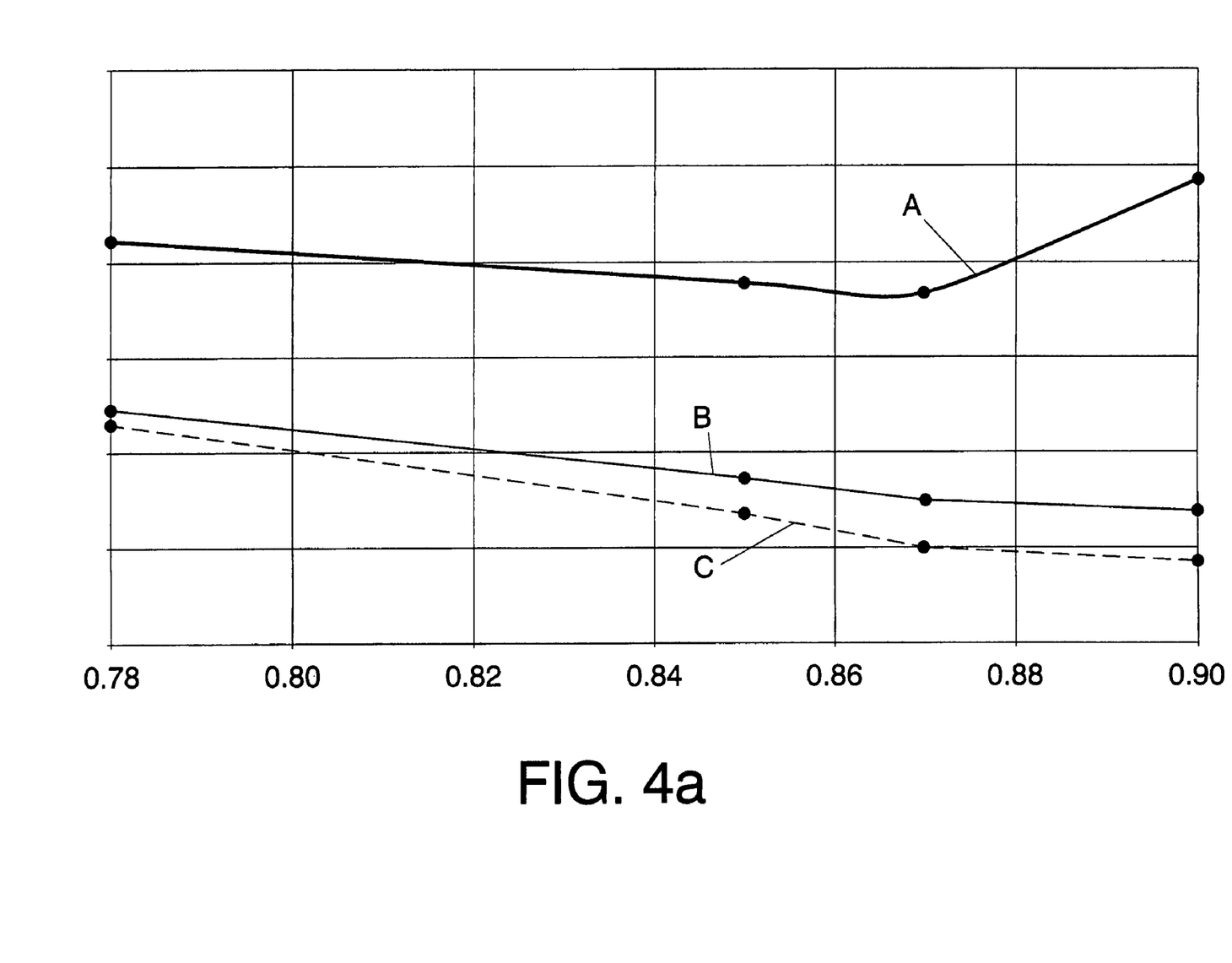
FIG. 4a shows a graph displaying the expected results obtained in a computation on the tail section.
Figure 4B:
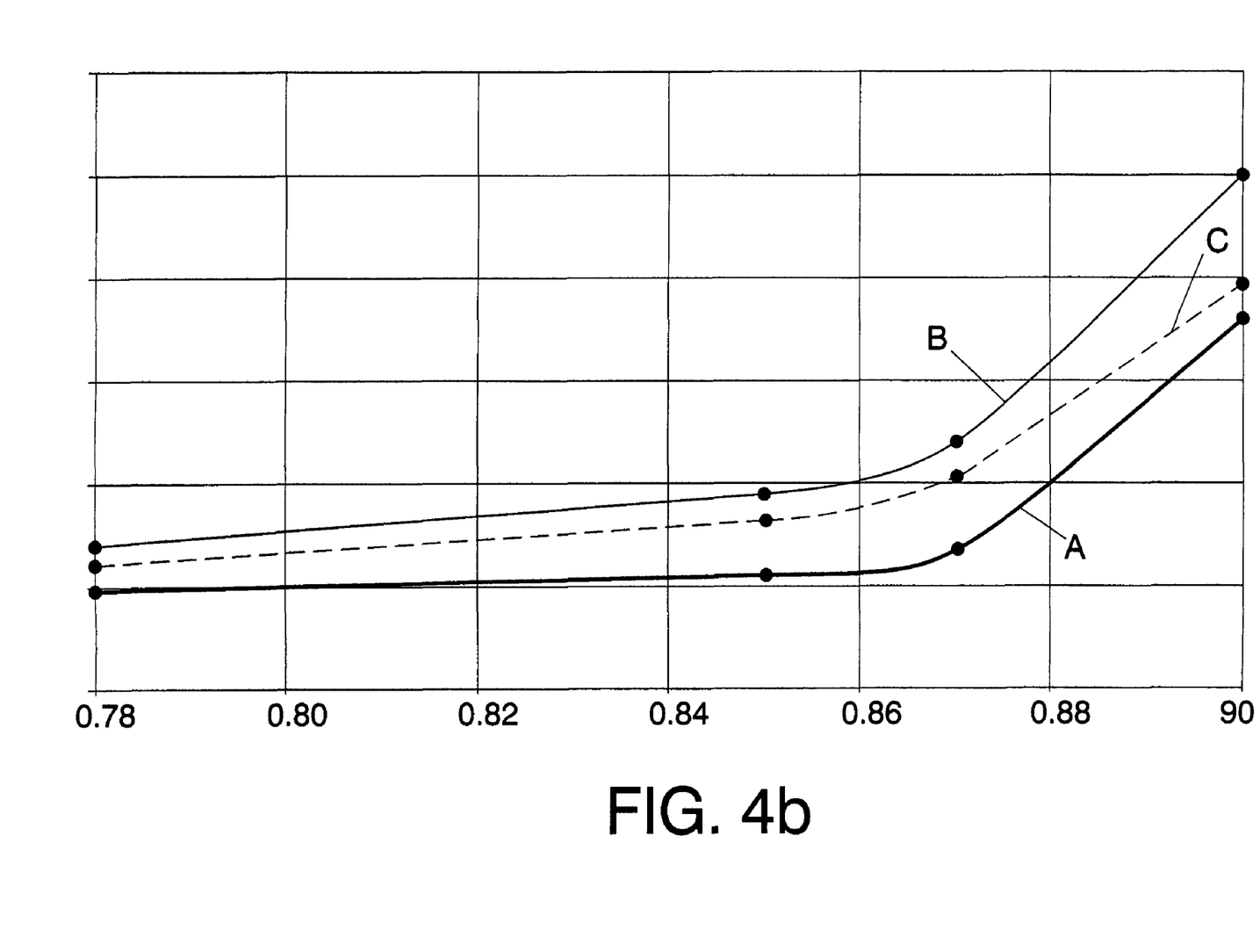
FIG. 4b shows a graph displaying the expected results obtained in a computation on the wings.

Finally, FIGS. 4a and 4b show separate graphs wherein can be seen the expected results from computations of the drag as a function of Mach number in the tail section and in the wings, respectively, where the curve A represents the expected results of a computation with conventional supports existing in the prior art, curve B represents the expected results of a computation in free flight, and curve C represents the expected results of a computation conducted with the support described by the present invention, where the distance between one line and the next of the vertical axis corresponds to 0.002 units of coefficient of drag (CD). So, it is clearly seen, both for the tail section and for the wing, at high speeds, in other words starting from Mach 0.85 or 0.88, how curve A (conventional supports existing in the art) starts to move away from the direction parallel to curve B (free flight), while curve C (support of the present invention) maintains the same ratio. In the words, the interference of the support is minimized in the computations with the support described by the present invention.

The invention claimed is:

1. A minimum aerodynamic interference support and a model for a cryogenic wind tunnel,
   wherein the model includes a fuselage, a tail section secured to the fuselage, and wings secured to the fuselage, the model being configured to emulate a tail section and/or wings of an aircraft,
   wherein the support comprises a front sting and a blade, the front sting being substantially parallel to the longitudinal axis of the model, and the front sting and the blade being integrated together and describing an obtuse angle,
   wherein the blade connects the front sting to the model,
   wherein the front sting of the support comprises an extension which extends horizontally underneath a front zone of the fuselage of the model starting from the point where the blade is connected to the front sting and extending past the point where the blade is connected to the model, and
   wherein the area of the cross-section of the extension is obtained by applying the area rule to the ensemble made up by the front sting, the blade, the model, and the extension such that the area of the cross-section of the extension varies in accordance with the area rule.

2. The minimum aerodynamic interference support and model of claim 1, wherein the blade is connected to the model at the front zone of the fuselage of the model.

3. The minimum aerodynamic interference support and model of claim 2, wherein the front sting, the blade, and the extension are constructed of high strength steel suitable for cryogenic conditions.

4. A method of using the support and model defined according to claim 2, the method comprising:
   conducting tests on the tail section of the model, leaving the wings and the horizontal and vertical stabilizers free.

5. A method of using the support and model defined according to claim 2, the method comprising:
   conducting tests on the tail section and on the wings of the model at the same time.

6. A method of using the support and model defined according to claim 2, the method comprising:
   testing in wind tunnels at ambient temperature and ambient pressure.

7. A minimum aerodynamic interference support and a model for a cryogenic wind tunnel,
   wherein the model includes a fuselage, a tail section secured to the fuselage, and wings secured to the fuselage, the model being configured to emulate a tail section and/or wings of an aircraft,
   wherein the support comprises a front sting and a blade, the front sting being substantially parallel to the longitudinal axis of the model, and the front sting and the blade being integrated together and describing an obtuse angle, wherein the blade connects the front sting to the model, wherein the front sting of the support comprises an extension which extends horizontally underneath a front zone of the fuselage of the model starting from the point where the blade is connected to the front sting and extending past the point where the blade is connected to the model, and wherein the extension is configured such that the variation in the transverse area of the model is equal to the variation in the transverse area of the support and the model.

8. The minimum aerodynamic interference support and model of claim 7, wherein the blade is connected to the model at the front zone of the fuselage of the model.

9. The minimum aerodynamic interference support and model of claim 8, wherein the front sting, the blade, and the extension are constructed of high strength steel suitable for cryogenic conditions.

10. A method of using the support and model defined according to claim 8, the method comprising:
   conducting tests on the tail section of the model, leaving the wings and the horizontal and vertical stabilizers free.

11. A method of using the support and model defined according to claim 8, the method comprising:
   conducting tests on the tail section and on the wings of the model at the same time.

12. A method of using the support and model defined according to claim 8, the method comprising:
   testing in wind tunnels at ambient temperature and ambient pressure.

* * * * *